(12) United States Patent
Neft

(10) Patent No.: US 9,348,586 B2
(45) Date of Patent: May 24, 2016

(54) METHOD AND SYSTEM FOR MIGRATING A PLURALITY OF PROCESSES IN A MULTI-PLATFORM SYSTEM BASED ON A QUANTITY OF DEPENDENCIES OF EACH OF THE PLURALITY OF PROCESSES TO AN OPERATING SYSTEM EXECUTING ON A RESPECTIVE PLATFORM IN THE MULTI-PLATFORM SYSTEM

(71) Applicant: Accenture Global Services Limited, Dublin (IE)

(72) Inventor: Mark Neft, Caldwell, NJ (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/488,398

(22) Filed: Sep. 17, 2014

(65) Prior Publication Data

US 2015/0007186 A1    Jan. 1, 2015

Related U.S. Application Data

(63) Continuation of application No. 12/652,930, filed on Jan. 6, 2010, now Pat. No. 8,856,795.

(60) Provisional application No. 61/177,149, filed on May 11, 2009.

(51) Int. Cl.
| | |
|---|---|
| *G06F 9/46* | (2006.01) |
| *G06F 9/44* | (2006.01) |
| *G06F 9/45* | (2006.01) |
| *G06F 3/06* | (2006.01) |

(Continued)

(52) U.S. Cl.
CPC .. *G06F 8/76* (2013.01); *G06F 8/31* (2013.01); *G06F 8/41* (2013.01); *G06F 3/065* (2013.01); *G06F 9/5055* (2013.01); *G06F 9/5088* (2013.01); *G06F 11/203* (2013.01); *G06F 17/303* (2013.01); *G06F 2009/4557* (2013.01); *G06F 2206/1012* (2013.01)

(58) Field of Classification Search
CPC .......... G06F 9/5055; G06F 2009/4557; G06F 9/5088; G06F 3/065; G06F 17/303; G06F 11/203; G06F 2206/12
See application file for complete search history.

(56) References Cited

U.S. PATENT DOCUMENTS

| | | |
|---|---|---|
| 5,506,987 A | 4/1996 | Abramson et al. |
| 5,960,200 A | 9/1999 | Eager |

(Continued)

OTHER PUBLICATIONS

HP and Intel, "Single Source for Multiple Platforms," 2 pages, copyright Apr. 2010.
IBM, "z/OS Basic Skills Information Center—Mainframe Concepts" 58 pages, copyright IBM Corp. 2005, 2008.
Oracle, "Oracle® Identity Manager—Connector Guide for IBM RACF Advanced," Release 9.0.2, 54 pages, Sep. 2006.

(Continued)

*Primary Examiner* — Xuxing Chen
(74) *Attorney, Agent, or Firm* — Fish & Richardson P.C.

(57) ABSTRACT

Embodiments of the claimed subject matter are directed to methods and a system that allows the reduction of costs attributed to executing applications on a multi-platform system (such as a mainframe) by migrating certain processes operating on one platform to another platform in the system. In one embodiment, the reduction of cost is achieved by a method for migrating an application executing in a partition operating a proprietary operating system to a second partition operating an alternate operating system and leveraging special purpose processors unavailable to the proprietary operating system, which can be much less costly to purchase and/or rent and license.

21 Claims, 7 Drawing Sheets

(51) Int. Cl.

| | |
|---|---|
| G06F 9/50 | (2006.01) |
| G06F 9/455 | (2006.01) |
| G06F 17/30 | (2006.01) |
| G06F 11/20 | (2006.01) |

(56) References Cited

U.S. PATENT DOCUMENTS

| | | | |
|---|---|---|---|
| 6,154,877 | A | 11/2000 | Ramkumar |
| 6,161,219 | A | 12/2000 | Ramkumar |
| 6,615,166 | B1 | 9/2003 | Guheen |
| 6,654,954 | B1 | 11/2003 | Hicks |
| 6,968,370 | B2 | 11/2005 | Wu |
| 7,150,012 | B2 | 12/2006 | Hill |
| 7,634,762 | B1 | 12/2009 | Wheeler |
| 7,720,970 | B2 | 5/2010 | Dube |
| 7,730,468 | B1 | 6/2010 | Trowbridge |
| 7,757,214 | B1 | 7/2010 | Palczak |
| 7,818,410 | B1 | 10/2010 | Barnes |
| 7,853,742 | B2 | 12/2010 | Rothman et al. |
| 8,095,929 | B1 | 1/2012 | Ji |
| 8,266,582 | B2 | 9/2012 | Prakash |
| 8,458,676 | B2 | 6/2013 | Asai et al. |
| 8,813,048 | B2 | 8/2014 | Neft |
| 8,832,699 | B2 | 9/2014 | Neft |
| 8,856,795 | B2 | 10/2014 | Neft |
| 9,027,005 | B2 | 5/2015 | Neft |
| 2002/0161748 | A1* | 10/2002 | Hamel et al. ............. 707/3 |
| 2003/0187915 | A1 | 10/2003 | Sun |
| 2004/0194055 | A1 | 9/2004 | Galloway |
| 2005/0091649 | A1 | 4/2005 | Qureshi |
| 2005/0268298 | A1 | 12/2005 | Hunt et al. |
| 2006/0031813 | A1 | 2/2006 | Bishop |
| 2006/0112247 | A1 | 5/2006 | Ramany et al. |
| 2006/0123111 | A1 | 6/2006 | Dea |
| 2006/0136695 | A1 | 6/2006 | Vaupel |
| 2006/0136910 | A1 | 6/2006 | Brickell |
| 2006/0136911 | A1 | 6/2006 | Robinson |
| 2006/0136912 | A1 | 6/2006 | Robinson |
| 2006/0150148 | A1 | 7/2006 | Beckett |
| 2007/0240143 | A1 | 10/2007 | Guminy |
| 2008/0184195 | A1 | 7/2008 | Lee |
| 2008/0235388 | A1 | 9/2008 | Fried et al. |
| 2008/0270515 | A1 | 10/2008 | Chen |
| 2008/0313257 | A1 | 12/2008 | Allen |
| 2009/0313004 | A1 | 12/2009 | Levi |
| 2009/0328033 | A1 | 12/2009 | Kohavi |
| 2010/0162252 | A1* | 6/2010 | Bacher ................. 718/102 |
| 2010/0191854 | A1 | 7/2010 | Isci |
| 2010/0287542 | A1 | 11/2010 | Neft |
| 2010/0287549 | A1 | 11/2010 | Neft |
| 2010/0287560 | A1 | 11/2010 | Neft |
| 2011/0289491 | A1 | 11/2011 | Hsiao |
| 2013/0036409 | A1 | 2/2013 | Auerbach et al. |
| 2014/0289714 | A1 | 9/2014 | Neft |
| 2014/0337851 | A1 | 11/2014 | Neft |
| 2015/0220334 | A1 | 8/2015 | Neft |

OTHER PUBLICATIONS

Perrone et al., "zSeries and z/OS HiperSockets Overview," IBM System Magazine, 5 pages, Jan. 2003.
White et al., "HiperSockets Implementation Guide," 132 pages, Mar. 2007.
Wikipedia, "Just-in-time Compilation," from Oct. 14, 2007, 3 pages.
U.S. Notice of Allowance for U.S. Appl. No. 12/652,920 dated Aug. 4, 2014, 13 pages.
U.S. Non-Final Office Action for U.S. Appl. No. 12/652,930 dated Aug. 13, 2012, 17 pages.
U.S. Non-Final Office Action for U.S. Appl. No. 12/652,930 dated Mar. 8, 2013, 15 pages.
U.S. Final Office Action for U.S. Appl. No. 12/652,930 dated Sep. 20, 2013, 9 pages.
U.S. Non-Final Office Action for U.S. Appl. No. 12/652,930 dated Feb. 25, 2014, 10 pages.
Office Action in Canadian Application No. 2,703,373, dated Aug. 28, 2014, 2 pages.
Office Action in Chinese Application No. 201010177487.2, dated Feb. 25, 2015, 6 pages (with English Translation).
Office Action in Chinese Application No. 201010177487.2, dated Nov. 4, 2014, 7 pages (with English Translation).
Office Action in Chinse Application No. 201010177487.2, dated Nov. 20, 2013, 11 pages (with English translation).
U.S. Final Office Action for U.S. Appl. No. 12/651,876 dated Sep. 14, 2012, 7 pages.
U.S. Non-Final Office Action for U.S. Appl. No. 12/651,876 dated Apr. 10, 2012, 11 pages.
U.S. Non-Final Office Action for U.S. Appl. No. 12/651,876 dated Sep. 26, 2013, 9 pages.
U.S. Non-Final Office Action for U.S. Appl. No. 12/652,667 dated Sep. 19, 2013, 34 pages.
U.S. Non-Final Office Action for U.S. Appl. No. 14/297,694 dated Nov. 10, 2014, 22 pages.
U.S. Non-Final Office Action for U.S. Appl. No. 14/338,850 dated May 11, 2015, 16 pages.
U.S. Notice of Allowance for U.S. Appl. No. 12/651,876, dated Jul. 1, 2014, 15 pages.
U.S. Notice of Allowance for U.S. Appl. No. 12/652,667 dated Feb. 27, 2014, 9 pages.
U.S. Notice of Allowance for U.S. Appl. No. 12/652,667 dated Jun. 2, 2014, 13 pages.
U.S. Notice of Allowance for U.S. Appl. No. 12/652,930 dated Aug. 4, 2014, 13 pages.
U.S. Notice of Allowance for U.S. Appl. No. 14/297,694 dated Jan. 26, 2015, 13 pages.
Yagoubi et al., "Load Balancing Strategy in Grid Environment," J Information Technol App., 1(4):285-296 (Mar. 1, 2007).
Office Action in Chinese Application No. 201010177487.2, dated Apr. 30, 2014, 7 pages (English Translation).
Office Action in EP Application No. 10250902.3, dated Dec. 14, 2015, 7 pages.
U.S. Notice of Allowance for U.S. Appl. No. 14/338,850 dated Nov. 18, 2015, 9 pages.

* cited by examiner

US 9,348,586 B2

METHOD AND SYSTEM FOR MIGRATING A PLURALITY OF PROCESSES IN A MULTI-PLATFORM SYSTEM BASED ON A QUANTITY OF DEPENDENCIES OF EACH OF THE PLURALITY OF PROCESSES TO AN OPERATING SYSTEM EXECUTING ON A RESPECTIVE PLATFORM IN THE MULTI-PLATFORM SYSTEM

CLAIM OF PRIORITY

This application is a continuation (and claims the benefit of priority under 35 USC 120) of U.S. application Ser. No. 12/652,930, filed Jan. 6, 2010, now allowed, which claims priority to provisional patent application entitled "Optimizing A Distribution of Applications Operating In A Multiple Environment System," Ser. No. 61/177,149 filed on May 11, 2009. Both of these prior applications are incorporated by reference in their entirety.

BACKGROUND

Mainframes are computing systems used mainly by large businesses and organizations for executing mission and task-critical applications (such as bulk data processing) that are often essential to the core of the business or organization. These applications often provide a competitive advantage to the organization, and thus mainframes are designed for the purposes of longevity, fault tolerance, and durability.

In addition, mainframes also offer vastly increased computing performance relative to ordinary person computers. Compared to a personal computer such as a PC, mainframes will commonly have hundreds to thousands of times as much data storage, and the capability to access, manipulate, and perform operations on such data much faster. Mainframes are designed to handle very high volumes of input and output (I/O) and emphasize throughput computing. Traditionally, mainframe designs have included several subsidiary computers (called channels or peripheral processors) which manage the I/O devices, leaving the central processing unit (CPU) free to deal only with high-speed memory. In addition, typical mainframe applications are often used to perform tasks which are essential to the core of the business operating the mainframe.

In addition, nearly all conventional mainframes also have the ability to run (or host) multiple operating systems, and thereby operate not as a single computer but as a number of virtual machines. This is most commonly achieved through the use of multiple logical partitions. Each logical partition, commonly referred to as an "LPAR," is a subset of a computing system's hardware resources that is virtualized as a separate computer. In this role, a single mainframe can replace dozens or even hundreds of smaller servers. As a general practice, mainframes often utilize the proprietary operating system of the mainframe's manufacturer, and conventional implementations may comprise a single mainframe operating numerous instances of the same operating system. Recent developments have enabled the combination of various, disparate operating systems operating in distributed logical partitions in the same mainframe.

Unfortunately, mainframes are typically very expensive to purchase and/or procure the services of. Moreover, mainframe operating systems and applications can also be very expensive to develop and/or license. Due to the relatively small number of mainframe manufacturers and software developers, mainframe consumers typically have few options beyond the mainframe manufacturer's proprietary operating system. Naturally, reliance on a single, proprietary operating system can be expensive and licensing fees for the proprietary operating system can contribute significantly to the cost of owning and operating a mainframe, as well as purchasing mainframe computing services. Moreover, these fees are almost certain to continue to grow for a mainframe consumer due to maintenance and upgrade fees.

In addition to software licensing fees, hardware costs also contribute significantly to the cost of owning and/or operating a sophisticated multi-platform computing device such as a mainframe. In particular, the cost of both owning and operating a mainframe computer may vary widely, depending on the particular hardware components used. A mainframe's specific configuration of storage space, memory, and processing capability are typically the most common factors in any variations of cost from mainframe to mainframe. In addition, a common practice is to equip some mainframes with special purpose processors which traditionally have a lower cost (both to procure and license) than general processing units. Unfortunately, these special purpose processors are typically designed to be strictly limited in applicability (e.g., usage) through the use of microcode. These limitations vary depending on the specific special purpose processor but can include, for example, restrictions on accessible operating systems and locally executing applications. As a result, usage of special purpose processors is limited to performing specific tasks, rather than general purpose processing.

An alternative to actual ownership of mainframes is to rent mainframe computing services from a mainframe service provider. In a typical arrangement, mainframe computing is rented to consumers either for a timed duration or, more commonly, on a set price for a given number of units of data processed, for example, by millions of instructions per second ("MIPs") processed by the rented mainframe. However, a service purchasing arrangement with these providers (which can be the mainframe manufacturers themselves) can often be just as expensive over time, especially if large quantities of data processing are required over long periods of time.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to methods and a system that allows the reduction of costs attributed to executing applications on a multi-platform system (such as a mainframe) by migrating certain processes operating on one platform to another platform in the system. In one embodiment, the reduction of cost is achieved by a method for migrating an application executing in a partition operating a proprietary operating system to a second partition operating an alternate operating system and leveraging special purpose processors unavailable to the proprietary operating system, which can be much less costly to purchase and/or rent and license.

In another embodiment, operating costs attributed to executing a plurality of applications distributed in a mainframe is reduced by a method which consists of: evaluating the candidacies of a plurality of processes executing in a first platform of a multi-platform system to determine which of the plurality of processes is eligible for migration, determine which of the plurality of evaluated processes would contribute to the greatest benefit from migration; calculating the savings in licensing costs of migrating the selection of processes; migrating the selection of processes from the first platform to the second platform according to the savings in licensing costs; and utilizing special purpose processors from the second platform to perform processing for the migrated applications.

In yet another embodiment, a system is provided for reducing operating costs by optimally migrating processes operating on one platform in a multi-platform system. According to some embodiments, the system includes a mainframe with special purpose processors and at least two logical partitions, with at least one platform executing on each of the partitions. Processes executing on one platform are migrated to the other platform to leverage the special purpose processors which are unavailable to local platform applications.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
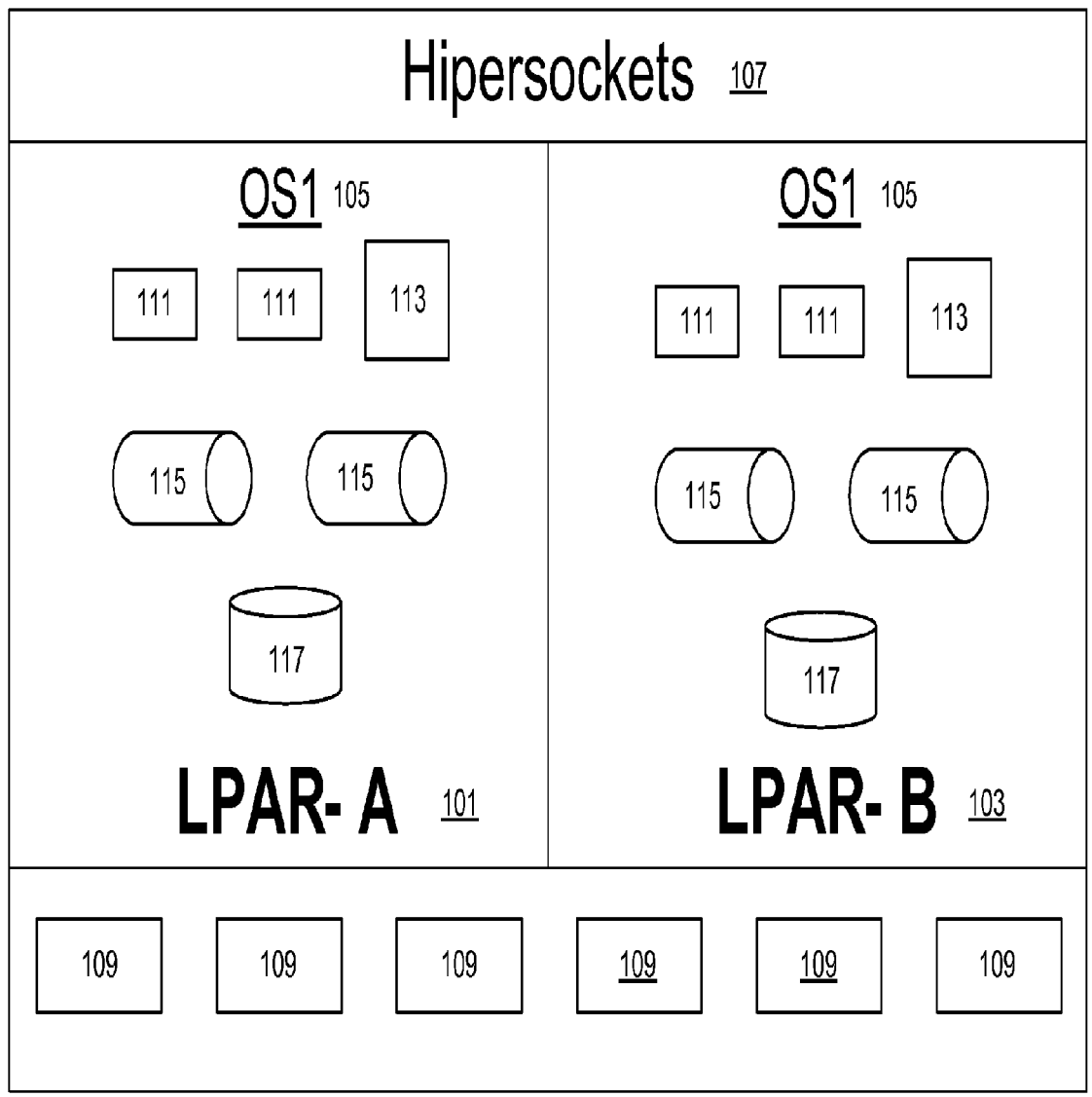
FIG. 1 depicts an exemplary conventional distribution of applications in a multi-partition mainframe, in accordance with various embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein (e.g., FIGS. 6, 7) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Application Distribution in a Mainframe

According to embodiments of the present invention, a system for optimally distributing processes between platforms in a multi-platform system is provided. In one embodiment, a system comprising a plurality of logical partitions, each partition hosting at least one platform and each platform executing one or more processes is provided. FIG. 1 depicts an exemplary conventional distribution of applications in a multi-partition system 100, in accordance with embodiments of the present invention.

In one embodiment, system 100 may be implemented as, for example, a mainframe computing system. As depicted, system 100 is implemented as a mainframe computing system comprising a plurality of logical partitions (e.g., LPAR-A 101 and LPAR-B 103). As presented, each logical partition hosts at least one platform. In one embodiment, the platform is implemented as an operating system (e.g., OS1 105). In further embodiments, these operating systems may be proprietary operating systems licensed by the mainframe's manufacturer. In a typical configuration, each partition is communicatively coupled via inter-partition communication means such as through a bus or through memory via a communication protocol (e.g., Hipersockets 107). In one embodiment, this communication protocol may be implemented as in-memory TCP/IP connections between and among varying operating systems and logical partitions. As depicted in FIG. 1, system 100 includes hipersockets 107 to facilitate communication between the separate partitions 101, 103.

In some embodiments, the system 100 may have a plurality of applications executing in one or more of the system's partitions 101, 103. In a typical embodiment, these applications may include, but are not limited to, transaction servers 111, databases 117 and database management applications 113, network communications software 115. In some embodiments, for partitions 101, 103 hosting the same platform 105, one or more of the applications running in one partition (e.g., partition 101) may also be executed in the same platform 105 hosted on the second partition (e.g., partition 103). In still further embodiments, system 100 may also include special purpose processors or engines (e.g., processors 109) for performing particular tasks only.

Alternate Platforms on Additional Logical Partitions

Figure 2:
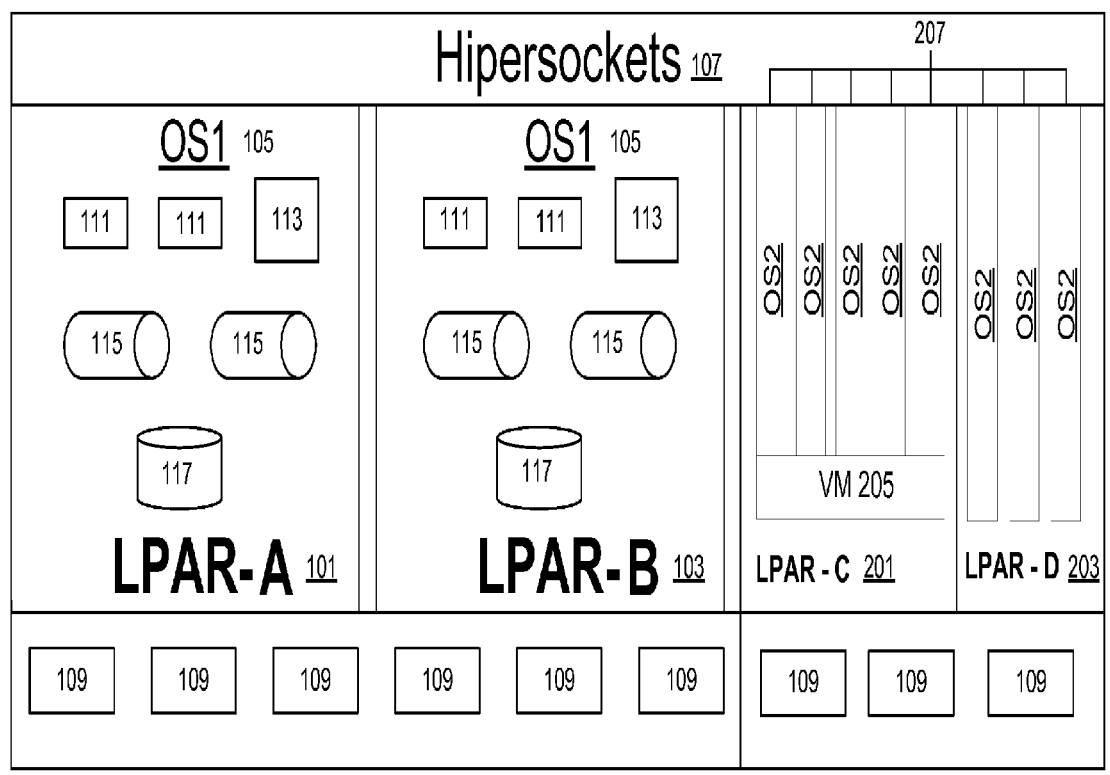
FIG. 2 depicts an exemplary distribution of applications in a multi-partition mainframe executing at least two operating systems, in accordance with various embodiments of the present invention.

In one embodiment, a mainframe or like computing system is configured to execute dissimilar platforms in multiple logical partitions. FIG. 2 depicts an exemplary distribution of applications in a multi-partition system 200 executing at least two operating systems, in accordance with various embodiments of the present invention. As presented, system 200 includes the logical partitions (e.g., LPAR-A 101 and LPAR-B 103) executing the same platform 105; hipersockets 107; applications (111, 113, 115, and 117) and special purpose processors 109; described above with reference to system 100 of FIG. 1. In typical configurations, the platforms executing on the logical partitions LPAR-A 101 and LPAR-B 103 may be proprietary operating systems licensed by the mainframe's manufacturer. However, this may lead to significant and/or excessive operating costs.

As shown in FIG. 2, the cost of operating additional platforms may be mitigated through the execution of alternate, lower-cost, and non-proprietary platforms. These platforms (e.g., OS2 207) may be executed on additional logical partitions (e.g., LPAR-C 201, LPAR-D 203) in the system 200. In one embodiment, the platforms may be executed directly as operating systems (e.g., instances of OS2 207 in LPAR-D 203). In alternate embodiments, the platforms may also be instanced as virtual machines (e.g., VM 205 of LPAR-C 201). Therefore, by using lower-cost and/or non-proprietary platforms, a mainframe operator or mainframe service consumer may be able to mitigate much of the operational costs due to software licensing that has traditionally been an unavoidable cost of using a mainframe.

Application Migration Across Disparate Platforms

Figure 3:
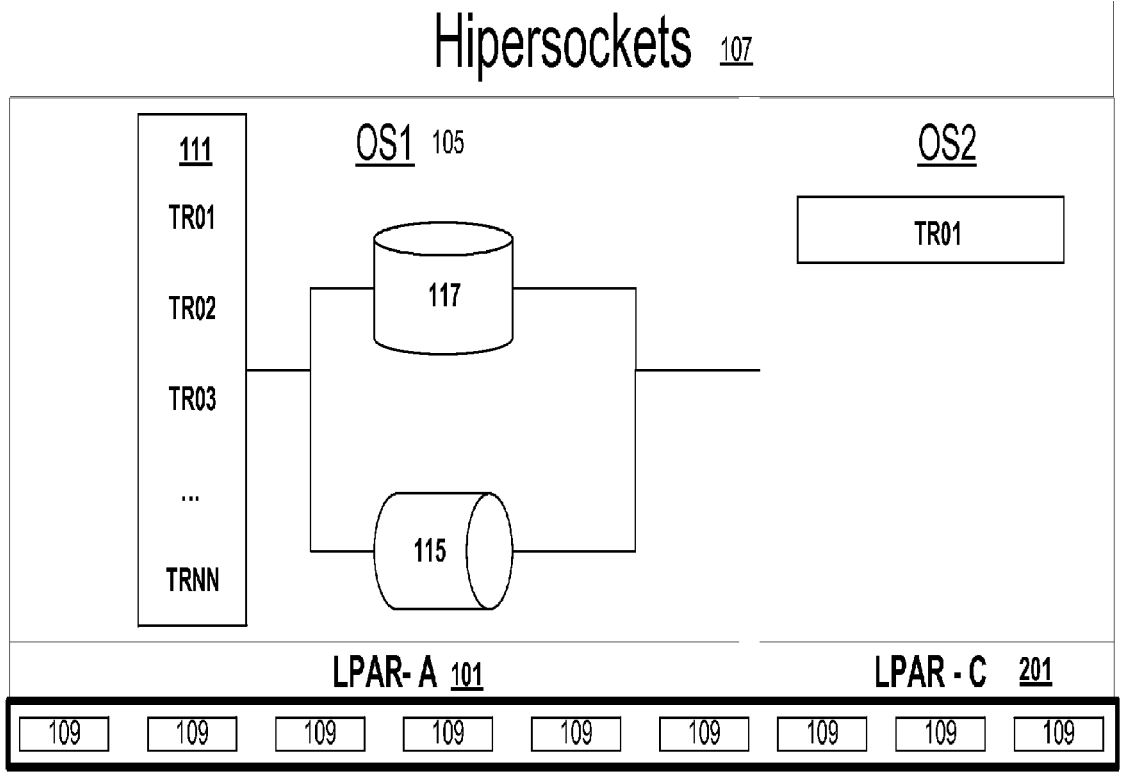
FIG. 3 depicts an exemplary migration of processes in a multi-platform mainframe executing at least two operating systems according to a first pre-defined stage, in accordance with various embodiments of the present invention.

In some embodiments, the cost of operating a mainframe may be further reduced by migrating pre-executing processes in a higher-cost and/or proprietary platform to a lower-cost and/or non-proprietary platform while balancing costs to efficacy, security, reliability and/or performance. However, not every application executing in a platform may be amenable towards migration. Accordingly, optimizing the balance of applications between each platform can result in significant savings while maintaining or exceeding current levels of performance. FIG. 3 depicts an exemplary migration of processes in a multi-platform system executing at least two operating systems according to a first pre-defined stage 300, in accordance with various embodiments of the present invention. In a typical configuration, system 300 includes multiple logical partitions (e.g., LPAR-A 101, LPAR-C 201); a first platform (e.g., OS1 105) executing on a logical partition (e.g., LPAR-A 101); a second platform (e.g., OS2 207) executing on the other logical partition (e.g., LPAR-C 201); and a plurality of applications (111, 117, 115).

As depicted in FIG. 3, an application (e.g., application 111) executing on the first platform may perform, during execution, a plurality of processes and/or transactions. These processes and transactions may incorporate additional applications executing within and/or without the first platform. In one embodiment, an application and/or a specific process or transaction of an application may be migrated from being executed in the first platform to being executed in the second platform. Migration of a process or transaction may be performed by, for example, duplicating the execution of the target transaction or process in the second platform and temporarily executing the process or transaction in both platforms concurrently. Thus, for example, data used by the process or transaction executing in the first platform may be duplicated and used in the process or transaction executing in the second platform. In one embodiment, the process may be duplicated to have the same source code. In still further embodiments, the process may be structured so that the same data runs through both instances of the process. Alternatively, the process may be structured such that specific instructions may be performed in alternating instances, the instructions delegated by a load processor. As discussed above, communication and data may be transferred between platforms via inter-partition communication means (e.g., hipersockets 107).

In some embodiments, certain applications are dependent on the specific application or portions of a specific application and may not be easily migrated. In one embodiment, applications with the least amount of dependencies while recouping the highest amount of savings may be prioritized. To determine the viability of migrating an application between platforms, a heuristic may be used to determine the application's candidacy. In one embodiment, an application's candidacy may be determined by evaluating the application's dependencies and relative coupling to the underlying operating system. In still further embodiments, the application's candidacy may include an estimated savings in computing cost.

In one embodiment, computing savings may be determined for a plurality of processes by generating the CPU consumption of an application or process, and parsing the source code for the application or process to determine the number of operands in the source code. The plurality of processes can subsequently prioritized by comparing the respective numbers of operands and CPU consumptions to determine the estimated savings.

In one embodiment, the dependencies of the specific applications in a platform may be determined by creating logic flows corresponding to each of the specific applications. The logic flows may be utilized to identify a demarcation of a process to migrate the process on to the other platform without increasing the latency and/or complexity of the operations.

In further embodiments, the target transaction or process may be monitored in the second platform to ensure the maintenance of certain standards or metrics (e.g., reliability, performance). In still further embodiments, a primary operation of the process or transaction may be transferred from the first platform to the second platform to increase testing or to complete migration, as desired. In one embodiment, one or more processes, transactions, or even applications may be migrated between platforms. According to these embodiments, the processes, transactions and applications executing in a first platform may be evaluated for suitability of migration. For example, certain applications which are intricately linked to the first platform may be unsuitable for migration, and thus may not be selected for migration. In some embodiments, migration of one or more applications may be performed in pre-defined stages, e.g., to minimize risk to the entire system. As depicted in FIG. 3, transaction 1 (e.g., TR01) is migrated between the first platform OS1 105 and the second platform OS2 207. In one embodiment, the first platform (e.g., OS1 105) may be implemented as a proprietary operating system licensed by the mainframe manufacturer. In some embodiments, the second platform (e.g., OS2 207) may be implemented as a lower-cost and/or non proprietary operating system.

Figure 4:
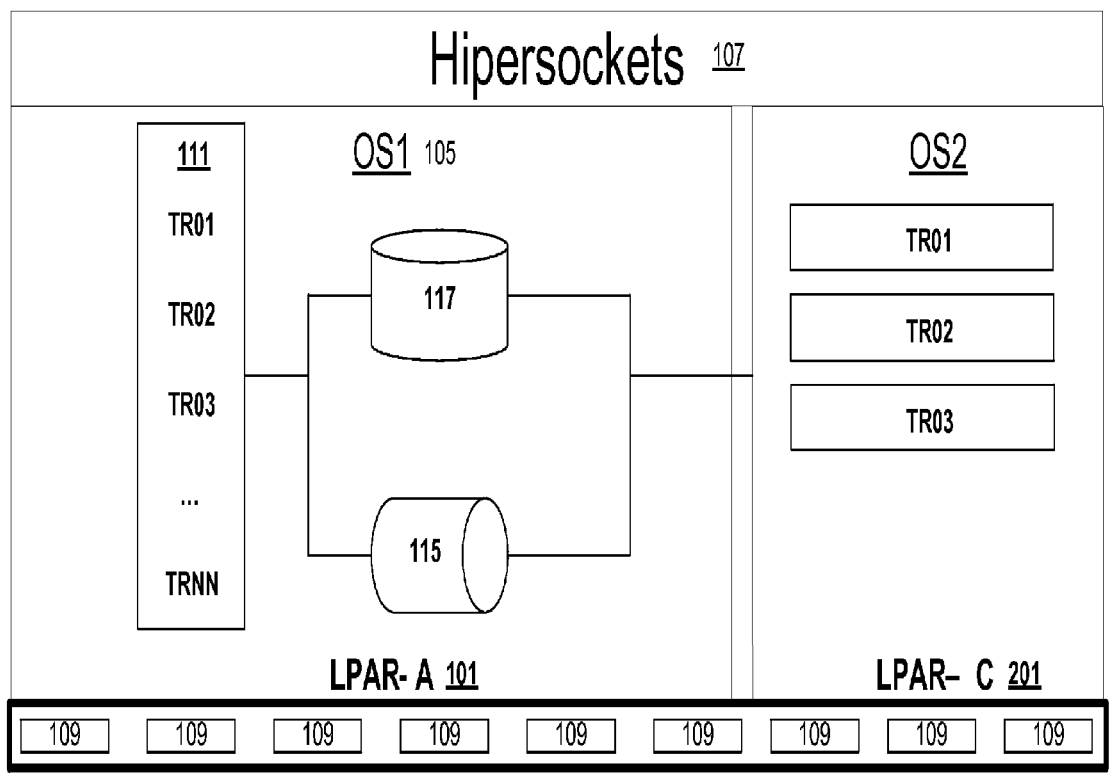
FIG. 4 depicts an exemplary migration of processes in a multi-platform mainframe executing at least two operating systems according to a second pre-defined stage, in accordance with various embodiments of the present invention.

FIG. 4 depicts an exemplary migration of processes in a multi-platform system executing at least two operating systems according to a second pre-defined stage 400, in accordance with various embodiments of the present invention. FIG. 4 includes the components of FIG. 3, but depicts the migration of additional transactions (e.g., TR02, TR03) comprising an application (e.g., application 111) from the first platform OS1 105 to the second platform OS2 207.

Figure 5:
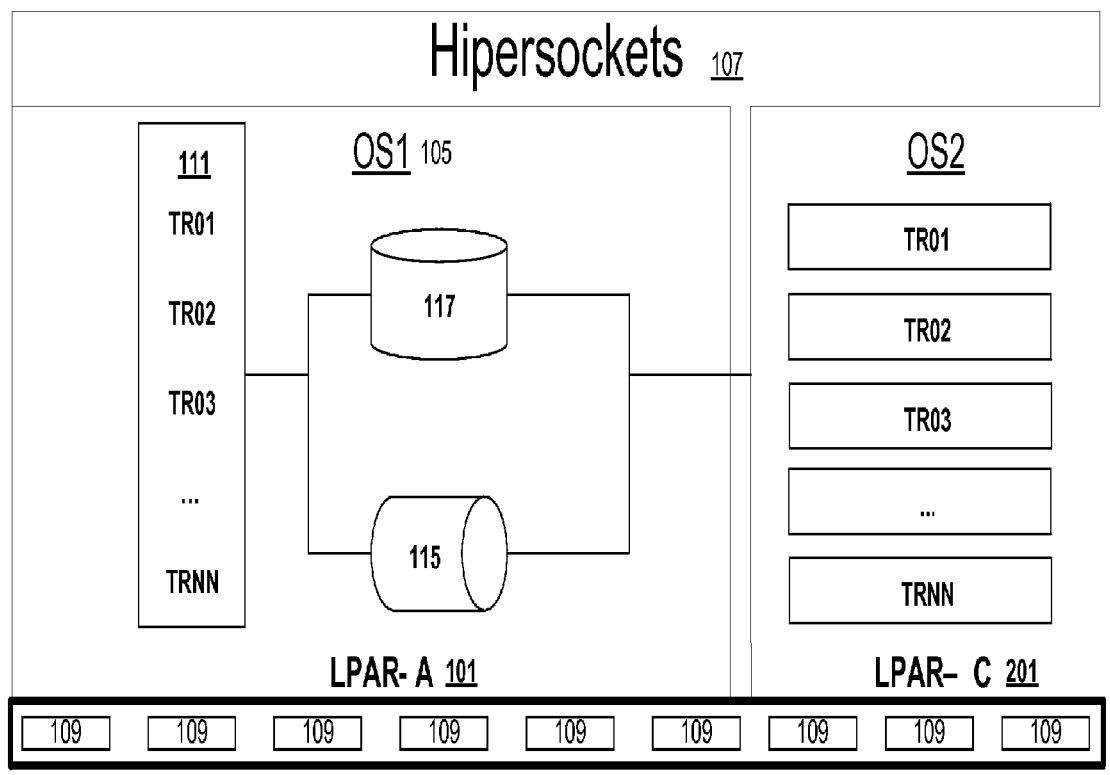
FIG. 5 depicts an exemplary distribution of processes in a multi-platform mainframe executing at least two operating systems after a process migration, in accordance with various embodiments of the present invention.

FIG. 5 depicts an exemplary distribution of processes in a multi-platform mainframe executing at least two operating systems after a process migration 500, in accordance with various embodiments of the present invention. FIG. 5 includes the components of FIGS. 3 and 4, and depicts the finalized migration of all of the transactions (e.g., TR02, TR03, . . . TRNN) comprising the application 111 from the first platform OS1 105 to the second platform OS2 207. Once an application or applications have been successfully migrated from the first platform to one or more other platforms, primary operation of the application may be transferred, and execution of the application in the first platform may be terminated. Thus, in some embodiments, only the transactions or processes intricately linked or specific to the first platform (e.g., assemblers) will remain executing on the first platform after migration is completed.

Reducing Hardware Costs of Operation by Application Migration

As previously discussed, a recent practice is to equip mainframes with special purpose processors that are cheaper than central processors and used to offload processing from central processors for certain tasks. This practice can reduce the cost of total processing, but in conventional implementations is limited by microcode that restricts the types of data instructions the special purpose processor can process. For example, one conventionally known special purpose processor is an integrated information processor. Integrated information processors are typically used to offload database management-related workloads from a mainframe's central processor. In general, the special purpose processor is accessible for processing remotely executing applications compliant with the Distributed Relational Database Architecture (DRDA) database interoperability standard through TCP/IP only, although access across logical partitions in a mainframe is also available via Hipersockets. However, the special purpose processor is typically unavailable for processing non DRDA queries (e.g., processing instructions) or instructions generated from locally executing processes of proprietary operating systems.

Figure 6:
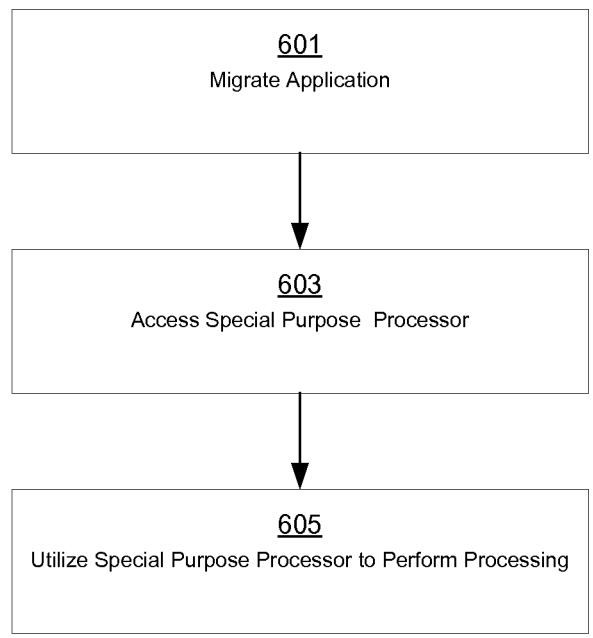
FIG. 6 depicts an exemplary flowchart of a process of reducing the cost of operating a multiplatform system by migrating an application between platforms to access special purpose processors, in accordance with various embodiments of the present invention.

According to embodiments of the claimed subject matter, further reduction in mainframe operating costs may be achieved by leveraging special purpose processors in the mainframe to perform processing traditionally reserved to general processors. FIG. 6 depicts an exemplary flowchart 600 of a method of reducing the cost of operating a multiplatform system by migrating an application between platforms to access special purpose processors, in accordance with various embodiments of the present invention. Steps 601-605 describe exemplary steps of the flowchart 600 in accordance with the various embodiments herein described.

At step 601, an application executing on a first software platform of a multi-platform computing system (e.g., system 100 described above) is migrated to a second software platform of the system. According to some embodiments, the first software platform may be implemented as an operating system, such as the proprietary operating system of the system manufacturer. In some embodiments, a special purpose processor disposed in the system is configured (e.g., via microcode) to be unavailable to perform processing for applications locally executed on the proprietary operating system, but is available to perform processing from remote applications, and/or local applications executing on a separate operating system. Migration may be performed according to various embodiments, and is described in further detail below, but generally includes replicating an instance of the application in the first software platform on the second software platform. In further embodiments, step 601 may be repeated for additional applications. In still further embodiments, migration of multiple applications may be performed simultaneously.

At step 603, a special purpose processor is accessed from the second platform by the application(s) migrated in step 601. In one embodiment, the special purpose processor is an integrated information processor. According to these embodiments, the integrated information processor may be configured to be unavailable to perform processing for non DRDA processing requests and for requests emanating from local applications executing on the proprietary operating system. In one embodiment, the special purpose processor is accessed from applications executing in the second platform via an in-memory communication protocol, such as a TCP/IP connection protocol operable to communicate data across logical partitions in a single system (e.g., hipersockets 107).

At step 605, the special purpose processor accessed from the second platform at step 603 is used to perform processing for the application migrated to the second platform at step 601. In some embodiments, data instructions for processing are communicated through the same in-memory communication protocol used to establish access with the special purpose processor at step 603 (e.g., hipersockets 107). Thus, by migrating an application to a software platform that enables the usage of special purpose processors for processing, the cost of owning and operating such a system may be advantageously reduced by replacing higher cost general purpose or central processors with the typically lower cost special purpose processors.

Figure 7:
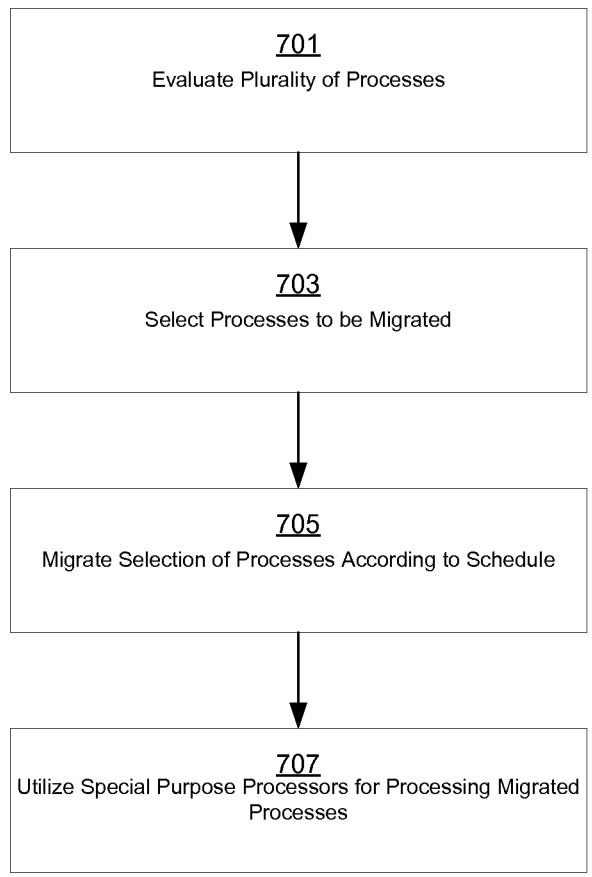
FIG. 7 depicts an exemplary flowchart of a process of reducing the operating costs attributed to executing a plurality of applications distributed in a mainframe, in accordance with various embodiments of the present invention.

With reference now to FIG. 7, an exemplary flowchart 700 of a process of reducing the operating costs attributed to executing a plurality of applications distributed among logical partitions in a mainframe is depicted, in accordance with various embodiments of the present invention. Steps 701-707 describe exemplary steps of the flowchart 700 in accordance with the various embodiments herein described. In one embodiment, flowchart 700 is provided to select the specific processes and/or applications executing in a first platform to be migrated to a second platform in order to leverage the processing capability of lower-cost special purpose processors, which are unavailable to the processes and applications whilst executed on the first platform.

At step 701, an evaluation of the applications executing in a first platform for suitability of migration is performed. In one embodiment, special purpose processors in the mainframe are configured to be unavailable to perform processing from the applications executing in the first platform. Evaluation of a process or transaction may include, for example, evaluating the processes and transactions comprising each application in the first platform. In one embodiment, an application's candidacy may be determined by evaluating the application's dependencies and relative coupling to the underlying operating system (e.g., whether the process is platform specific). In still further embodiments, the application's candidacy may include an estimated savings in computing cost.

At step 703, a plurality of migration candidates is selected from the plurality of applications evaluated at step 701. In one embodiment, migration candidates are less likely to include platform specific and highly dependent applications and processes, and more likely to include self-contained applications and processes and/or applications and processes with relatively low computing overhead.

At step 705, the selection of processes identified in step 703 is migrated to a second platform in the system according to a schedule. In one embodiment, the second platform is an operating system hosted on an alternate logical partition in the system. In further embodiments, the second platform comprises an operating system that is not prevented by the microcode of the special purpose processors to use the processors to perform processing. In one embodiment, the migration schedule may be pre-determined. In further embodiments, the schedule may be arranged to prioritize the processes according to various heuristics. These heuristics may include, for example, prioritization according to the application or process's dependencies and coupling to the underlying software platform.

These heuristics may also include prioritizing the selection of processes according to the estimated savings in computing costs and operating costs attributable to migrating the process or application. Computing cost may be calculated by, for example, considering the computing savings for the selection of processes by generating the CPU consumption of the particular transaction, application, or process, and parsing the source code for the application or process to determine the number of operands in the source code. The cost plurality of processes can be further calculated by comparing the respective numbers of operands and CPU consumptions to determine the estimated savings. In further embodiments, the schedule may be implemented as a series of sequential stages, and migrated according to the stages provided in the schedule.

At step 707, the special purpose processors of the system are accessed by the migrated processes executing on the second software platform to perform processing. In one embodiment, the special purpose processors are accessed from applications executing in the second platform via an in-memory communication protocol, such as a TCP/IP connection protocol operable to communicate data across logical partitions in a single system (e.g., hipersockets 107). In further embodiments, data instructions for processing are communicated through the same in-memory communication protocol used to establish access with the special purpose processor (e.g., hipersockets 107). Therefore, by selectively choosing the best candidates for migration between a first platform and second platform to circumvent the restrictions governing the special purpose processors, the reduction in operating costs may be further optimized.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
evaluating a candidacy of a plurality of processes executing on a general purpose processor of a first platform of a multi-platform system for migration to a different, second platform of the multi-platform system by determining, for each of the plurality of processes, a quantity of dependencies of the respective process to a proprietary operating system executing on the first platform, wherein the second platform comprises a special purpose processor;
selecting a process from the plurality of processes to be migrated from the first platform to the second platform using the corresponding quantity of dependencies of each of the plurality of processes; and
executing a new instance of the process on the second platform concurrently while the process continues to execute on the first platform.

2. The method of claim 1, wherein:
evaluating the candidacy of the plurality of processes executing on the first platform of the multi-platform system for migration to the different, second platform comprises determining, for each of the plurality of processes, a corresponding cost savings if the respective process is migrated from the general purpose processor of the first platform to the special purpose processor of the second platform; and
selecting the process from the plurality of processes to be migrated from the first platform to the second platform comprises selecting the process from the plurality of processes to be migrated from the first platform to the second platform using the corresponding costs savings of each of the plurality of processes.

3. The method of claim 2, wherein selecting the process from the plurality of processes to be migrated from the first platform to the second platform using the corresponding costs savings of each of the plurality of processes comprises selecting the process with a highest cost savings.

4. The method of claim 1, wherein selecting the process from the plurality of processes to be migrated from the first platform to the second platform using the corresponding quantity of dependencies of each of the plurality of processes comprises selecting the process with a smallest quantity of dependencies.

5. The method of claim 1, wherein:
the multi-platform system comprises a plurality of logical partitions including a first logical partition and a second logical partition; and
the proprietary operating system of the first platform executes on the first logical partition, and a non-proprietary operating system of the second platform executes on the second logical partition.

6. The method of claim 1, wherein:
evaluating the candidacy of the plurality of processes comprises determining whether the process is specific to the first platform; and
executing the new instance of the process on the second platform concurrently while the process continues to execute on the first platform comprises executing the new instance of the process on the second platform concurrently while the process continues to execute on the first platform in response to determining that the process is not specific to the first platform.

7. The method of claim 1, comprising monitoring the execution of the process on the second platform to ensure predetermined standards for the execution of the process.

8. The method of claim 7, wherein monitoring the execution of the process on the second platform to ensure the predetermined standards for the execution of the process comprises monitoring the reliability of the execution of the process on the second platform.

9. The method of claim 7, wherein monitoring the execution of the process on the second platform to ensure the predetermined standards for the execution of the process comprises monitoring the performance of the execution of the process on the second platform.

10. The method of claim 1, wherein executing the new instance of the process on the second platform concurrently while the process continues to execute on the first platform comprises duplicating data used by the process for use by the process executing on the second platform.

11. The method of claim 10, comprising using output from both the process executing on the first platform and from the process executing on the second platform.

12. The method of claim 10, comprising:
testing the execution of the process on the second platform prior to changing a destination of real time data for the process from the first platform to the second platform; and
determining that the execution of the process on the second platform passes the testing and, in response, changing the destination of real time data for the process from the first platform to the second platform.

13. The method of claim 1, wherein selecting the process to be migrated from the first platform to the second platform comprises selecting the process that is part of an application executing on the first platform, the method comprising:
testing the execution of the process on the second platform prior to changing a destination of real time data for the process from the first platform to the second platform;
determining that the execution of the process on the second platform passes the testing and, in response, changing the destination of real time data for the process from the first platform to the second platform; and
selecting another process from the plurality of processes that is part of the application executing on the first platform to be migrated from the first platform to the second platform.

14. The method of claim 1, wherein selecting the process to be migrated from the first platform to the second platform comprises selecting a process that comprises a self-contained application executing on the first platform.

15. The method of claim 1, comprising terminating the execution of the process on the first platform.

16. The method of claim 1, wherein executing the new instance of the process on the second platform comprises executing the new instance of the process on the special purpose processor.

17. The method of claim 1, wherein the special purpose processor comprises a processor that is not configured to process computer instructions that are associated with the proprietary operating system.

18. The method of claim 1, wherein the special purpose processor comprises a processor that is configured to process remotely executing applications that are compliant with the Distributed Relational Database Architecture (DARDA) database interoperability standard only.

19. The method of claim 1, wherein:
evaluating the candidacy of the plurality of processes executing on the general purpose processor of the first platform of the multi-platform system for migration to the second platform of the multi-platform system comprises determining, for the process from the plurality of processes, whether the process is platform specific to the proprietary operating system using the quantity of dependencies of the process to the proprietary operating system; and
selecting the process from the plurality of processes to be migrated from the first platform to the second platform using the corresponding quantity of dependencies of each of the plurality of processes comprises selecting the process from the plurality of processes to be migrated from the first platform to the second platform in response to determining that the process is not platform specific to the proprietary operating system.

20. A system comprising:
one or more computers and one or more storage devices storing instructions that are operable, when executed by the one or more computers, to cause the one or more computers to perform operations comprising:
evaluating a candidacy of a plurality of processes executing on a general purpose processor of a first platform of a multi-platform system for migration to a different, second platform of the multi-platform system by determining, for each of the plurality of processes, a quantity of dependencies of the respective process to a proprietary operating system executing on the first platform, wherein the second platform comprises a special purpose processor;
selecting a process from the plurality of processes to be migrated from the first platform to the second platform using the corresponding quantity of dependencies of each of the plurality of processes; and
executing a new instance of the process on the second platform concurrently while the process continues to execute on the first platform.

21. A non-transitory computer-readable medium storing software comprising instructions executable by one or more computers which, upon such execution, cause the one or more computers to perform operations comprising:
evaluating a candidacy of a plurality of processes executing on a general purpose processor of a first platform of a multi-platform system for migration to a different, second platform of the multi-platform system by determining, for each of the plurality of processes, a quantity of dependencies of the respective process to a proprietary operating system executing on the first platform, wherein the second platform comprises a special purpose processor;
selecting a process from the plurality of processes to be migrated from the first platform to the second platform using the corresponding quantity of dependencies of each of the plurality of processes; and
executing a new instance of the process on the second platform concurrently while the process continues to execute on the first platform.

* * * * *

UNITED STATES PATENT AND TRADEMARK OFFICE
CERTIFICATE OF CORRECTION

PATENT NO.        : 9,348,586 B2                                      Page 1 of 1
APPLICATION NO.   : 14/488398
DATED             : May 24, 2016
INVENTOR(S)       : Mark Neft It is certified that error appears in the above-identified patent and that said Letters Patent is hereby corrected as shown below:

In the Claims

In claim 18, column 11, line 60, delete "(DARDA)" and insert -- (DRDA) --, therefor.

Signed and Sealed this
Second Day of August, 2016

Michelle K. Lee
*Director of the United States Patent and Trademark Office*